(12) United States Patent
Chatterjee et al.

(10) Patent No.: US 10,824,959 B1
(45) Date of Patent: Nov. 3, 2020

(54) EXPLAINERS FOR MACHINE LEARNING CLASSIFIERS

(71) Applicant: Amazon Technologies, Inc., Seattle, WA (US)

(72) Inventors: Bibaswan Kumar Chatterjee, West Bengal (IN); Srinivasan Sengamedu Hanumantha Rao, Bangalore (IN)

(73) Assignee: Amazon Technologies, Inc., Seattle, WA (US)

(*) Notice: Subject to any disclaimer, the term of this patent is extended or adjusted under 35 U.S.C. 154(b) by 1198 days.

(21) Appl. No.: 15/045,030

(22) Filed: Feb. 16, 2016

(51) Int. Cl.
*G06N 20/00* (2019.01)
*G06N 7/00* (2006.01)
*G06N 3/08* (2006.01)

(52) U.S. Cl.
CPC .............. *G06N 20/00* (2019.01); *G06N 3/08* (2013.01); *G06N 7/005* (2013.01)

(58) Field of Classification Search
None
See application file for complete search history.

(56) References Cited

U.S. PATENT DOCUMENTS

| | | | | |
|---|---|---|---|---|
| 4,763,277 A * | 8/1988 | Ashford | ............. | G06N 5/04 706/47 |
| 5,161,158 A * | 11/1992 | Chakravarty | ....... | G06F 11/2257 714/26 |
| 5,422,981 A * | 6/1995 | Niki | ................. | G06K 9/66 382/159 |
| 5,942,689 A * | 8/1999 | Bonissone | ............. | G01N 29/07 73/159 |
| 5,974,405 A * | 10/1999 | McGuinness | .......... | G06N 5/045 706/45 |
| 6,466,877 B1 * | 10/2002 | Chen | ..................... | G01N 33/346 702/35 |
| 6,522,978 B1 * | 2/2003 | Chen | ..................... | G01N 33/346 702/182 |
| 9,400,639 B2 * | 7/2016 | Kalai | ........................ | G06F 8/30 |
| 9,430,766 B1 * | 8/2016 | Kraft | ..................... | G06Q 20/352 |
| 2001/0048522 A1 * | 12/2001 | Yonezawa | .............. | G01N 21/25 356/237.2 |

(Continued)

OTHER PUBLICATIONS

Baesens, B. et al. (2003). "Using neural network rule extraction and decision tables for credit-risk evaluation." Management science 49.3 (2003): 312-329. (Year: 2003).*

(Continued)

*Primary Examiner* — Kamran Afshar
*Assistant Examiner* — Benjamin J Buss
(74) *Attorney, Agent, or Firm* — Robert C. Kowert; Kowert, Hood, Munyon, Rankin & Goetzel, P.C.

(57) ABSTRACT

A transformed data set corresponding to a machine learning classifier's training data set is generated. Each transformed record contains a modified version of a corresponding training record, as well as the prediction made for the training record by the classifier. A set of explanatory rules is minded from the transformed data set, with each rule indicating a relationship between the prediction and one or more features corresponding to the training records. From among the rule set, a particular matching rule is selected to provide an easy-to-understand explanation for a prediction made by the classifier for an observation record which is not part of the training set.

20 Claims, 10 Drawing Sheets

System 100

(56) References Cited

U.S. PATENT DOCUMENTS

| | | | | |
|---|---|---|---|---|
| 2002/0010620 | A1* | 1/2002 | Kowalchuk | G06Q 10/06375 |
| | | | | 705/7.32 |
| 2003/0087456 | A1* | 5/2003 | Jones | A61B 5/0059 |
| | | | | 436/171 |
| 2006/0235815 | A1* | 10/2006 | Kerisit | G06N 5/045 |
| | | | | 706/47 |
| 2008/0273761 | A1* | 11/2008 | Kawata | G06K 9/00281 |
| | | | | 382/115 |
| 2008/0275811 | A1* | 11/2008 | Koningstein | G06Q 20/102 |
| | | | | 705/38 |
| 2009/0044279 | A1* | 2/2009 | Crawford | G06F 21/55 |
| | | | | 726/26 |
| 2009/0123895 | A1* | 5/2009 | Hill | G09B 19/00 |
| | | | | 434/219 |
| 2013/0132001 | A1* | 5/2013 | Yacout | G01D 3/10 |
| | | | | 702/35 |
| 2014/0229164 | A1* | 8/2014 | Martens | G06F 17/241 |
| | | | | 704/9 |
| 2015/0254766 | A1* | 9/2015 | Abramowitz | G06N 3/08 |
| | | | | 705/38 |

OTHER PUBLICATIONS

Andrews, R. et al. (1995). "Survey and critique of techniques for extracting rules from trained artificial neural networks". Knowledge-Based Systems vol. 8 No. 6 Dec. 1995. (Year: 1995).*
Wang, Q. (2012). "Developing a Computational Framework for Explanation Generation in Knowledge-based Systems and its Application in Automated Feature Recognition". Dissertation. RMIT University. (Year: 2012).*
Scott, A.C. et al. (1977). "Methods for Generating Explanations". American Journal of Computational Linguistics, Microfiche 62, 1977. (Year: 1977).*
Lim, B.Y. et al. (2009). "Why and Why Not Explanations Improve the Intelligibility of Context-Aware Intelligent Systems". CHI 2009, Apr. 4-9, 2009. ACM. pp. 2119-2128. (Year: 2009).*
U.S. Appl. No. 15/719,402, filed Sep. 28, 2017, Mohammed Hidayath Ansari et al.
Wikipedia, "C4.5 algorithm", Retrieved from URL: https://en.wikipedia.org/wiki/C4.5_algorithm on Dec. 20, 2015, pp. 1-4.
Wenmin Li, et al., "CMAR: Accurate and Efficient Classification Based on Multiple Class-Association Rules*", In Data Mining, ICDM 2001, Proceedings IEEE International Conference, 2001, pp. 369-376.
Wikipedia, "CN2 algorithm", Retrieved from URL: https://en.wikipedia.org/wiki/CN2_algorithm on Dec. 20, 2015, pp. 1-2.
Peter Clark, et al., "The CN2 Induction Algorithm", Machine Learning 3, 1989, pp. 261-28, Kluwer Academic Publishers, The Netherlands.
Florian Verhein, "Frequent Pattern Growth (FP-Growth) Algorithm an Introduction", School of Information Studies, 2008, pp. 1-10, The University of Sydney, Australia.
"The ID3 Algorithm", Retrieved from URL: http://www.cise.ufl.edu/~ddd/cap6635/Fall97/Shortpapers/2.htm on Dec. 20, 2015, pp. 1-7.
"Is See5/C5.0 Better Than C4.5?", Retrieved from URL: http://www.rulequest.com/see5comparison.html on Dec. 20, 2015, pp. 1-4.
Pratik Jawanpuria, et al., "Generalized Hierarchical Kernel Learning" Journal of Machine Learning Research 16, 2015, pp. 617-652.
Xiaoxin Yin, et al., "CPAR: Classification based on Predictive Association Rules*", In the Proceedings of the third SIAM International Conference of Data Mining, 2003, pp. 331-335.
William W. Cohen, et al., "A Simple, Fast, and Effective Rule Learner", American Association for Artificial Intelligence, 1999, pp. 1-8.
Rakesh Agrawal, et al., "Fast Algorithms for Mining Association Rules", In the Proceedings of the 20th VLDB Conference, 1994, pp. 1-13.
U.S. Appl. No. 15/688,678, filed Aug. 28, 2017, Mohamed Thahir Peer Mohamed et al.
Daniel Smilkov, et al., "SmoothGrad: removing noise by adding noise", arXiv:1706.03825v1, Jun. 12, 2017, pp. 10.
Unknown, "Andosa/treeinterpreter", Retrieved from https://github.com/andosa/treeinterpreter on Dec. 30, 2019, pp. 3.
Tim Bock, "How to Interpret Logistic Regression Coefficients", Retrieved from https://www.displayr.com/how-to-interpret-logistic-regression-coefficients/ on Dec. 30, 2019, pp. 8.
Edward Ma, "Interpreting your deep learning model by Shap", Retrieved from https://towardsdatascience.com/interpreting-your-deep-learning-model-by-shap-e69be2b47893 on Dec. 10, 2019, pp. 10.
Marco Tulio Ribeiro, et al, "Local Interpretable Model-Agnostic Explanations (LIME): An Introduction", Retrieved from https://www.oreilly.com/learning/introduction-to-local-interpretable-model-agnostic-explanations-lime on Dec. 10, 2019, pp. 17.
Sebastian Lapushkin, et al, "LRP Toolbox for Artificial Neural Networks 1.2.0—Manual", 2016, pp. 20.
Unknown, "Simplifying Decision Tress Interpretability with Python & Scikit-learn", Retrieved from https://www.kdnuggets.com/2017/05/simplifying-decision-tree-interpretation-decision-rules-python.html on Dec. 30, 2019, pp. 12.
U.S. Appl. No. 16/742,746, filed Jan. 14, 2020, Shikhar Gupta et al.

* cited by examiner

Training data 401

Input variables 405

Target/output variable 407

|  | Country | Year-of-birth | Annual-income | Favorite sport |
|---|---|---|---|---|
| Rec0 | USA | 1975 | $85000 | Baseball |
| Rec1 | UK | 1982 | $100000 | Cricket |
| Rec2 | UK | 1994 | $70000 | Soccer |
| Rec3 | Japan | 1977 | $98000 | Tennis |

Classifier predictions table 411

|  | Predicted favorite sport |
|---|---|
| Rec0 | Baseball |
| Rec1 | Cricket |
| Rec2 | Soccer |
| Rec3 | Soccer |

Transformed training data and predictions 421 (input to rule miner)

|  | Binarized country | Binned year-of-birth | Binned annual-income | Predicted favorite sport |
|---|---|---|---|---|
| Rec0 | 1-0-0 | 0 (1970s) | 1 (75000-90000) | Baseball |
| Rec1 | 0-1-0 | 1 (1980s) | 3 (>= 100000) | Cricket |
| Rec2 | 0-1-0 | 2 (1990s) | 0 (< 75000) | Soccer |
| Rec3 | 0-0-1 | 0 (1970s) | 2 (90000-100000) | Soccer |

Easy-to-understand rules 425 (output of rule miner)

|  | Attribute predicate 1 |  | Attribute predicate 2 |  | Implication |
|---|---|---|---|---|---|
| Explanatory assertion/rule R0 | Country == UK | AND | Income > 90000 | ... → | Favorite sport == Cricket |
| Explanatory assertion/rule R1 | Country == US | AND | Year-of-birth < 1980 | ... → | Favorite sport == Baseball |

Example table 521 of information available to rule miner (un-transformed version of input attributes shown)

|  | Country | Year-of-birth | Annual-income | Predicted favorite sport |
|---|---|---|---|---|
| Rec0 | UK | 1980 | $60000 | Soccer |
| Rec1 | UK | 1982 | $100000 | Cricket |
| Rec2 | UK | 1978 | $70000 | Soccer |
| Rec3 | Japan | 1977 | $98000 | Tennis |
| Rec4 | UK | 1989 | $50000 | Soccer |
| Rec5 | USA | 1981 | $110000 | Golf |
| Rec6 | UK | 1997 | $75000 | Soccer |
| Rec7 | UK | 1992 | $178000 | Golf |
| Rec8 | UK | 1983 | $65000 | Soccer |
| Rec9 | UK | 1987 | $105000 | Rugby |

Examples of rule ranking criteria 530

|  | Attribute predicates | Implication | Support (attribute predicate match ratio) | Confidence(correct prediction ratio) |
|---|---|---|---|---|
| R0 | Country == UK | Favorite sport == Soccer | 8/10 = 80% | 5/8 == 62.5% |
| R1 | (Country == UK) AND (Year-of-birth < 1985) | Favorite sport == Soccer | 4/10 = 40% | 3/4 == 75% |
| R2 | (Country == UK) AND (Year-of-birth < 1985) AND (Income < 100000) | Favorite sport == Soccer | 3/10 = 30% | 3/3 == 100% |

...

Rule set 525 (with support and confidence metrics)

EXPLAINERS FOR MACHINE LEARNING CLASSIFIERS

BACKGROUND

Machine learning combines techniques from statistics and artificial intelligence to create algorithms that can learn from empirical data and generalize to solve problems in various domains such as natural language processing, financial fraud detection, terrorism threat level detection, human health diagnosis and the like. In recent years, more and more raw data that can potentially be utilized for machine learning models is being collected from a large variety of sources, such as sensors of various kinds, web server logs, social media services, financial transaction records, security cameras, and the like.

Classification, or the task of identifying to which of a set of categories (sub-populations) a new observation belongs, on the basis of a training set of data containing observations (or instances) whose category membership is known, is one of the most useful and often-used categories of machine learning techniques. A number of algorithms for classification of different levels of sophistication have been developed over the years, including, for example, linear classifiers such as logistic regression algorithms, Bayesian classifiers, support vector machines, decision-tree based algorithms, neural network-based algorithms and the like. The classification decision-making process of some of the algorithms (e.g., straightforward decision-tree based algorithms such as Classification and Regression Tree or CART) may be easier to understand, at least for non-experts, than for other algorithms (e.g., various techniques employing artificial neural networks).

For many use cases, the ability to explain (at least to some reasonable extent) the decisions or predictions made by a classification algorithms may be significant. For example, if a loan applicant is denied a loan by a financial organization, the loan applicant may wish to understand the reasoning behind the decision. Unfortunately, empirical results have shown that at least for some types of data sets, the classification algorithms that tend to make the best decisions are also among the more difficult to explain. On the other hand, techniques that are easy to explain often do not make the most accurate predictions. Thus, balancing the need for high-quality classification decisions with the need for easy-to-understand explanations may present a non-trivial challenge.

BRIEF DESCRIPTION OF DRAWINGS

FIG. 4 illustrates a simple example of the generation of explanatory rules for a classifier's predictions, according to at least some embodiments.

FIG. 5 illustrates examples of criteria which may be used to evaluate or rank rules, according to at least some embodiments.

Figure 1:
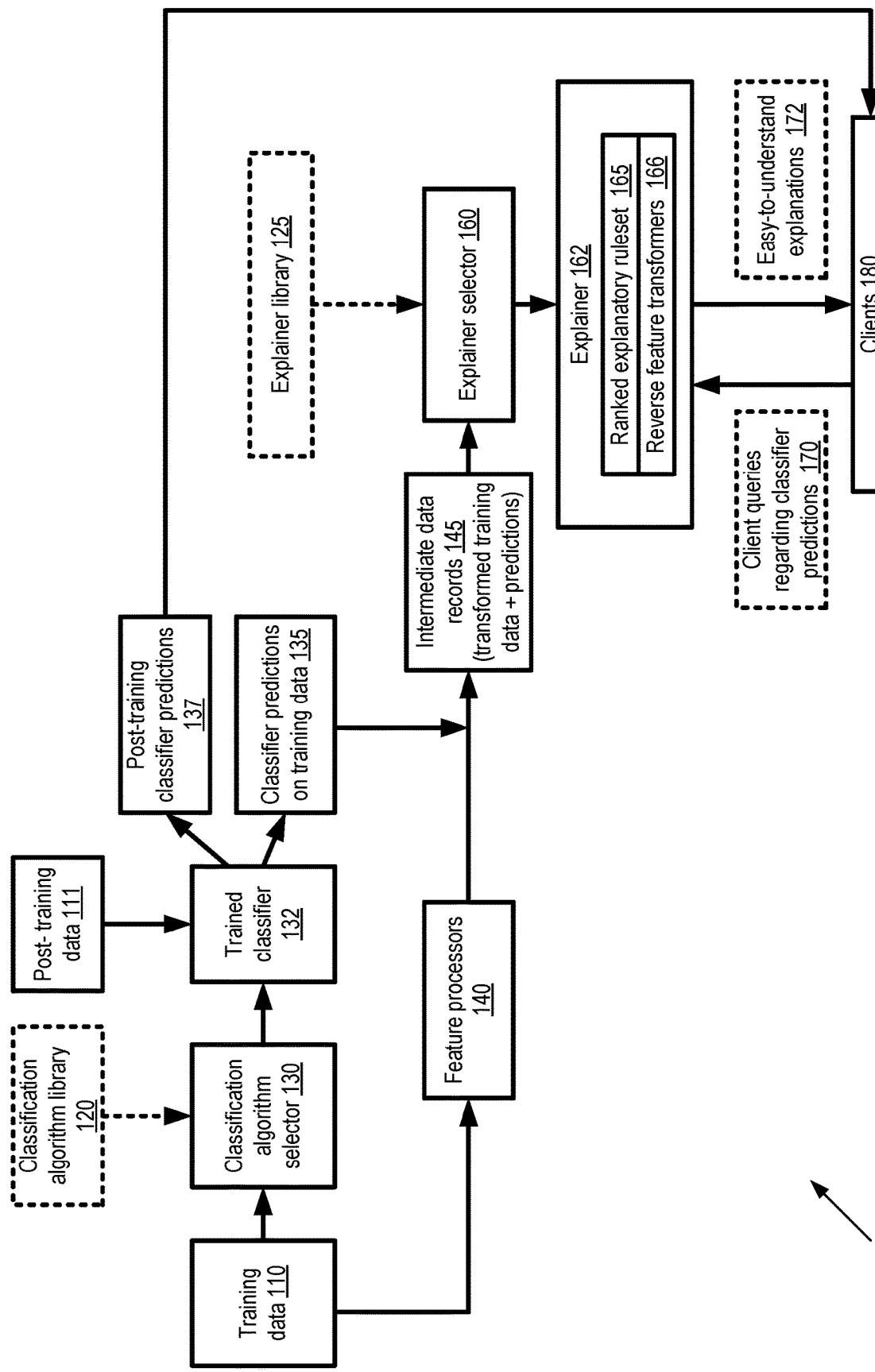
FIG. 1 illustrates an example system environment in which easy-to-understand explanatory rules for complex classifiers may be generated and ranked relative to one another, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for providing easy-to-understand explanations for potentially complicated classification models are described. The terms "classifier", "classification model", and "classification algorithm implementation" may be used interchangeably herein. The term "explainer" may be used herein to refer to a programmatic entity that determines a set of rules, implications or assertions which can help to explain the prediction decisions made by a trained classifier. The techniques described herein separate the tasks of (a) making the best-possible classification predictions (which may utilize complex machine learning techniques that are hard for a lay person to understand) from (b) providing explanations for the classification predictions, expressed ideally in easy-to-understand predicates on the values of the input data attributes or features. The explanations may be generated in some embodiments by applying selected transformations to at least a subset of the data used to train the classifiers, and then using rule-mining techniques on the combination of the classifier's predictions and the transformed training data, as described below in further detail.

In some embodiments, the techniques for explain classification decisions may be implemented as part of a comprehensive machine learning service of a provider network. In other embodiments, explainers may be generated for at least some types of classifiers without utilizing the resources of a large-scale machine learning service—e.g., a standalone tool for providing explanatory rules of a classifier may be employed, which can be installed locally on any desired type of computing devices or servers. Generally speaking, networks set up by an entity such as a company or a public sector organization to provide one or more services (such as various types of multi-tenant and/or single-tenant cloud-based computing or storage services) accessible via the Internet and/or other networks to a distributed set of clients may be termed provider networks in this document. A provider network may also sometimes be referred to as a "public cloud" environment. A given provider network may include numerous data centers hosting various resource pools, such as collections of physical and/or virtualized computer servers, storage devices, networking equipment and the like, needed to implement, configure and distribute the infrastructure and services offered by the provider. Within large provider networks, some data centers may be located in different cities, states or countries than others, and in some embodiments the resources allocated to a given application may be distributed among several such locations to achieve desired levels of availability, fault-resilience and performance. The machine learning service of a provider network may be designed to respond to a variety of client request categories in batch mode as well as in real-time. For example, the machine learning service may train, test and evaluate a wide variety of models (e.g., for supervised and/or unsupervised learning) in response to client requests received via a set of programmatic interfaces of the service (e.g., application programmatic interfaces or APIs, web-based consoles, command-line tools, or graphical user interfaces).

According to one embodiment, a client of a machine learning service may submit a request to generate a classification model for a specified data set or data source (a source from which various observation records may be collected by the service and used for training the requested model). Each observation record may contain one or more input variables and at least one output or "target" variable (the variable for which the model is make predictions). The target variable may typically comprise a "class" variable, which can take on one of a discrete set of values representative of respective sub-groups or classes of the observation records. A classification algorithm or methodology may be selected at the service in some embodiments, e.g., based on the client's preferences as indicated in the model generation request, based on entries or heuristics in a knowledge base of the machine learning service, or based on some combination of such factors. At least a subset of the data set may be designated as a training set, and a classification model may be trained using the training set. At least in some embodiments, the classification algorithm may be selected (either by the client or by the service) based primarily on the expected quality of the predictions—that is, an algorithm may be chosen based on how good its predictions typically have been for similar data sets, independently of whether the algorithm is easy to explain or hard to explain.

After the model has been trained, its output or predictions for the various records of the training set may be obtained in some embodiments. In addition, in at least some embodiments, depending on the kind of input variables of attributes which make up the training set's observation records, a transformed intermediate data set may be created by applying selected feature processing or transformation functions to the raw training data. Such transformations, which may include for example binarization of some or all categorical attribute values and/or binning of some or all numeric attribute values, may be performed to simplify the task of mining rules corresponding to the classifier's predictions. The transformed data (which may comprise as many records as the original training set in at least some implementations), together with the predictions made by the classifier on the underlying un-transformed training data records, may be provided as input to a selected rule mining algorithm or rule miner. Any appropriate rule mining algorithm which can generate explanatory rules (e.g., in terminology that can be understood relatively easily by lay clients as well as by expert clients) from the transformed training data records and their corresponding predictions may be used in various embodiments. It is noted that while several techniques for generating explanatory rules may require binarization, binning and/or other similar transformations, other techniques (such as some decision-tree based algorithms for rule generation) may not require such transformations in at least some embodiments. In the latter scenario, the intermediate data set used as input for rule mining may simply include the untransformed training data and the corresponding predictions of the classifier. In some embodiments, the rule mining algorithm may be selected by the service (e.g., based on knowledge base entries), while in at least one embodiment the client may suggest or propose a rule mining algorithm if desired. Some number of explanatory rules or assertions may be generated for the predictions already made with respect to the training data set by the classifier. A given explanatory rule or assertion may be considered as a combination of one or more attribute predicates (e.g., ranges or exact matches of input attribute values) and implied target class values. For example, one rule may be expressed as the logical equivalent of "if (input attribute A1 is in range R1) and (input attribute A2 has the value V1), then the target class is predicted to be TC1". In this rule, the constraints on A1 and A2 respectively represent two attribute predicates, and the rule indicates an explanatory relationship between the predicates and the prediction regarding the target class.

In scenarios in which multiple explanatory rules are generated, they may then be ranked relative to one another using any combination of a variety of metrics and techniques in different embodiments. For example, rules may be ranked based on their explanatory accuracy or confidence level (e.g., how often their implication between the attribute predicates and the target class holds true, within the training data and/or a test data set comprising observations which were not used for training the classifier), their support or coverage (e.g., what fraction of observations meet the predicates indicates in a given rule), and so on. In various embodiments, the ranking process may involve the use of test or evaluation data sets—e.g., the predictions for a group of observation records which were not used for training may be obtained from the classifier, and the explanatory rules may be ranked based on how well they are able to explain these post-training predictions (e.g., predictions on test data). In some embodiments, the ranking procedure may utilize at least some of the training data and the corresponding classifier predictions.

The trained classifier may be used to make predictions for new, as-yet-unexamined observation records. Upon determining the prediction produced for a given observation by the classifier, a client may in general have one of two reactions. In some cases, the prediction may make intuitive sense to the client, or at least may not prompt the client to seek further explanation. In other cases, the client may be puzzled by the decision made by the classifier, or at least may wish to obtain some indication of the reasoning justifying the decision. In the latter scenario, the client may submit a query or request for an explanation of the prediction. In effect, such a request may comprise the logical equivalent of the question "Can you explain why this observation OR-new resulted in this prediction P-j for the target class?" The explainer may respond to such a request in one of two ways. If, based on an examination of the ranked rules obtained via rule mining, one or more rules which match the observation (e.g., if OR-new's attribute values are compatible with the attribute properties indicated in a rule predicate), and match the prediction (e.g., if the rule's implication for the target class prediction matches the actual prediction made by the classifier) are found, the explainer may provide a representation of the highest-ranking rule to the client. It is noted that such an explanatory rule, while indicate observed relationships between observation attributes and the classifier's predictions, may not necessarily be representative of the actual logic used within the classifier. That is, at least in some cases the classifier may have made the prediction based on one or more factors which are not indicated in the explanatory rule provided to the client. Similarly, in at least some cases, at least some of the predicates indicated in the explanatory rule may not actually have been taken into consideration by the classifier when making its prediction.

If no matching rule can be found, a message indicating that no explanation is currently available (or the logical equivalent of such a statement) may be provided to the client. In some embodiments, the explainer may store metrics indicating how many unsatisfactory query responses (e.g., responses for which no explanations could be provided to the client) have been generated over time. If the number of unsatisfied queries reaches a threshold, in some embodiments a new round of explainer generation (e.g., using a larger training data set including at least some observations for which no satisfactory explanation was provided earlier) and/or model training may be performed. Thus, over time, the effectiveness of the explainers (and/or the classifiers) may be increased in a data-driven fashion. By separating out the explainer generation from the classifier training in the manner described above, it may become easier to achieve two potentially conflicting goals—choosing the most accurate classifiers available (regardless of their complexity) and providing easy-to-understand explanations of classifier predictions.

In some embodiments, variations on the basic scheme for generating explainers regardless of classification model complexity may be implemented. Some classification techniques, such as those based on neural networks, may generate internal representations of the input data or intermediate data structures which are neither part of the input data, nor part of the model output. The predictions made by some such models may sometimes depend more directly on these internal representations (which may sometimes be referred to as "hidden" layers of the model) than on the raw input data values themselves. That is, the relationship between the model outputs, the internal representations, and the raw input data may be expressed as the logical equivalent of the following: "internal representations {IR} depend on raw input data" and "model output depends on {IR}". In one embodiment in which the classifier produces such internal representation, the rule mining algorithms may be run on the combination of (a) the internal representations, (b) the (potentially transformed) input data and (c) the predictions made by the classifier. That is, the kinds of information from which rules can be mined may be extended beyond just the transformed input data and the predictions, potentially leading to a more comprehensive and accurate rule set. In such an embodiment, when a client requests an explanation for a particular prediction, a first level explanation may sometimes be provided in terms of the intermediate representations. The explanations may be extended backwards towards the raw input attribute values—e.g., if a client is not satisfied with a first-level explanation based on the internal representation, additional levels of rule mining may be performed, and an explanation ultimately couched in terms of the raw input variable values may be provided.

In one embodiment, a client may choose the classification algorithm, train a model according to the classification algorithm, and then provide the predictions corresponding to the training set (and the training set itself) to a machine learning service or to an explainer tool to generate a set of explanatory rules for the predictions made by the classifier. That is, the service or tool may not be involved in the classification procedure, and may simply use the output of the classifier (and at least a portion of the data set for which the classifier output is produced) as input to a rule miner in such an embodiment.

The types of classifiers for which explainers may be generated using rule mining in various embodiments may include, for example, neural network-based classifiers, random forest models, boosted gradient tree models, etc. In general, easy-to-understand explanatory rules may be generated for any desired model in different embodiments, regardless of the complexity of the model, although clients may be more likely to submit explanation queries for more complex models. Any combination of one or more of a wide variety of rule mining algorithms may be employed in various embodiments. Such algorithms may include, for example, an Apriori algorithm, an FP-Growth (Frequent Pattern-Growth) algorithm, a CPAR (Classification based on Predictive Association Rules) algorithm, a CN2 induction algorithm, a CMAR (Classification based on Multiple Association Rules) algorithm, a SLIPPER (Simple Learner with Iterative Pruning to Produce Error Reduction) algorithm, a CART (Classification and Regression Tree) algorithm, an ID3 (Iterative Dichotomizer 3) algorithm, a C4.5 algorithm or a C5.0 algorithm.

Example System Environment

FIG. 1 illustrates an example system environment in which easy-to-understand explanatory rules for complex classifiers may be generated and ranked relative to one another, according to at least some embodiments. As shown, system 100 includes classification algorithm library 120 and explainer library 125. From the classification algorithm library, classification algorithm selector 130 may choose a particular algorithm to be used to train a model for a given input data set comprising training data 110 in the depicted embodiment. In some embodiments, the algorithm may be selected based on client input—e.g., a client 180 may submit a request to train a classification model, and the request may include a desired classification methodology. In other embodiments, the algorithm may be selected based on other factors such as some indication of the problem domain for which observation records are to be classified, the schema of the observation records, knowledge base entries indicating successful classification algorithms identified in earlier classification efforts, and the like. A trained classifier 132 may be obtained using the training data 110 and the selected algorithm.

A sophisticated classification algorithm may be selected in at least some cases, whose prediction decisions may be difficult to interpret in isolation by non-experts. In anticipation of potential client queries requesting explanations of the trained classifier's predictions, an effort may be undertaken in the depicted embodiment to generate a set of easy-to-understand explanatory rules. The training data may be transformed in any of several ways by feature processors 140—e.g., as discussed below, categorical attribute values may be converted to a set of binary values, numeric attribute values may be binned, and so on. The transformed versions of the training data records may be combined with the classifier predictions 135 (which may have been produced for the untransformed or original training data records) to form intermediate data records 145 used as input to generate an explainer for the classifier's predictions.

A number of different explainer algorithms (which may also be referred to as rule mining algorithms) may be available in library 125 in the depicted embodiment, from which a particular algorithm may be chosen by explainer selector 160 to generate attribute-predicate based rules in the depicted embodiment. Each rule of the explainer 162 may indicate some set of conditions or predicates based on attribute values in the transformed or untransformed versions of the training set observation records, and an indication of the target variable value predicted by the classifier if the set of conditions is met. A number of rules with different levels of specificity may be generated. The rules may be ranked relative to one another, using various metrics such as support (e.g., the fraction of the training data which meets the attribute criteria of the rule), confidence or accuracy (e.g., the fraction of the rule's predictions which match the classifier's predictions, etc.), precision, recall, etc. in different embodiments and for different types of classification problems. For example, different ranking metrics may be used for binary classification than for multi-class classification. In some embodiments, a test data set comprising observation records which were not used to train the classifier may be used to rank the rules. For example, the rules may initially be generated using the training data, and then evaluated relative to one another based on the differences between (a) the actual predictions made on the test data set by the trained classifier and (b) the predictions indicated in the rules. The support or coverage of the rules with respect to the test data set may also be used to rank the rules. Rules may be mined iteratively in at least some embodiments—that is, if a first set of rules does not meet targeted support or accuracy requirements levels, additional data records may be added and a different set of rules may be generated and evaluated.

At the end of the rule generation and ranking phase, a ranked explanatory ruleset 165 may be available at explainer 162. In some embodiments in which the rules are originally expressed in terms of transformed attributes rather than the original attributes of the data, the explainer 162 may also include one or more reverse feature transformer components 166. The reverse feature transformers 166 may reformulate the rules in terms of the original input data attributes, which may make the rules easier to understand for clients.

As indicated in FIG. 1, the procedure of training a classifier may be separated from the procedure for explaining the decisions of the trained classifier. As such, any classification algorithm of arbitrary complexity may be selected, based for example purely on the reputation, expected quality, or accuracy of the algorithm's predictions, without taking the ease of explaining the algorithm's decisions into account. The explanatory rules may be mined using the predictions made by the trained classifier, regardless of the sophistication of the classifier, and not using the actual target attribute values of the training data set in the depicted embodiment—that is, the explanations may be focused on the classifier's decisions rather than on the input observations used to generate the classifier itself.

After the classifier has been trained using training data 110, it may be used to obtain predictions on new data (e.g., post-training data 111). The post-training classifier predictions 137 may be provided to clients 180. In some cases, a client 180 may wish to understand why a particular prediction was made by the classifier. In the depicted embodiment, a query 170 requesting an explanation of the prediction for a given post-training data record may be submitted to explainer 162. In response, the explainer may compare the attribute values of the post-training data record with the attribute predicates in its ranked rule set 165, and the classifier's prediction with the prediction indicated in the rules. In some embodiments, for example, the rules may be indexed by the attribute predicates, so that the search for a matching or applicable rule is made more efficient. In other embodiments, a sequential search of the rule set (e.g., in descending rank order) may be performed.

The highest ranking rule which appears to correctly explain the classifier's prediction may be provided to the client as part of an easy-to-understand explanation 172 in the depicted embodiment. In some embodiments, multiple rules which can each explain the classifier's prediction may be included in the response provided to the client. In at least one embodiment, a particular rule to be included in the explanation 172 may be selected from a group of applicable rules based on factors such as the complexity (e.g. the number of attribute predicates) of the rule itself. In some implementations, the rule which appears to be the broadest and easiest to understand may be selected. Of course, it may sometimes be the case that no rule which matches or overlaps either the attribute values of the observation record for which the query was received can be found, or that the prediction indicated in the rule does not match the prediction made by the classifier 132. In such a situation, the explainer 162 may provide an indication to the client 180 that no satisfactory explanatory rule was found. The explainer may keep track of the number of cases in which an explanatory rule could not be found in some embodiments. If the number or fraction of such unsatisfactory responses exceeds a threshold, additional rules may be mined and/or the classifier may be retrained with additional records in one such embodiment.

The algorithm employed for trained classifier 132 may have a layered architecture in some embodiments—e.g., internal data structures representing various properties of the input data may be generated in some neural network-based models, and the internal representations may be used to produce the classification predictions. In some such embodiments, the internal representations may be added to the input data used by the explainer, and/or at least some of the rules generated may be expressed in terms of the internal representations. If a client 180 requests an explanation of a classifier's prediction, and is provided an explanation in terms of internal representations, it may sometimes be the case that the client may demand additional explanations. The first-level explanation, expressed in terms of internal representations, may itself be explainable in terms of input attributes with which the client is familiar (e.g., as a result of additional rule mining iterations performed with respect to the first-level explanation). Thus, multiple layers of explanatory rules or assertions may be generated in some embodiments, with some explanations based on internal data structures or representations, and others based on input data attributes.

As mentioned earlier, the technique for generating explanations for classifier predictions may be employed for a wide variety of sophisticated classification algorithms, including neural-network based algorithms, random forest algorithms, or boosted gradient tree algorithms and the like. Rule mining or explainer algorithms may include, for example, Apriori algorithms, FP-Growth (Frequent Pattern-Growth) algorithms, CPAR (Classification based on Predictive Association Rules) algorithms, CART (Classification and Regression Tree) algorithms, among others. It is noted that in some embodiments, some algorithms usable for classification may also be usable for rule mining—that is, there may sometimes be an overlap between the explainer library 125 and the classification algorithm library 120.

Machine Learning Service

Figure 2:
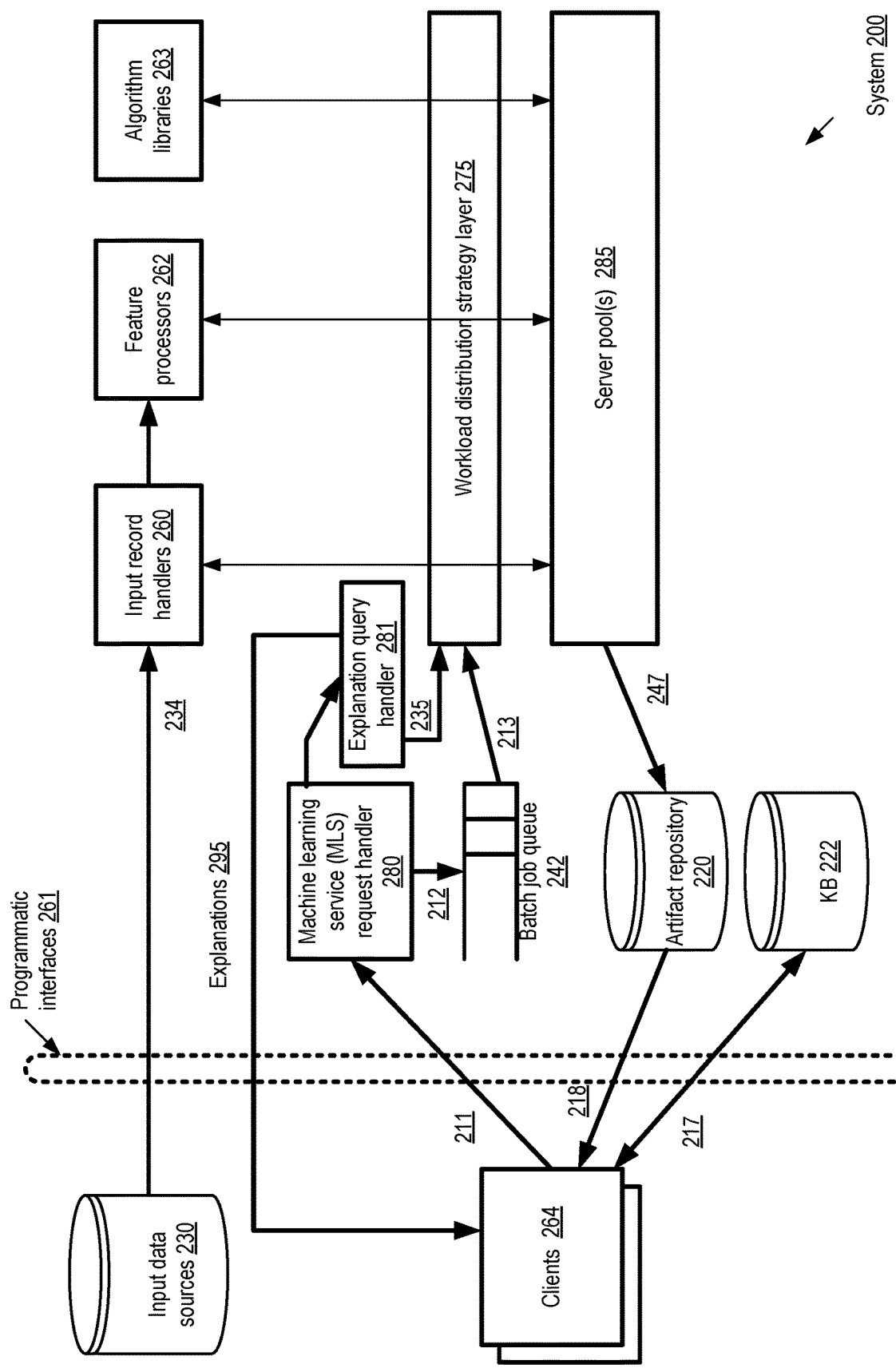
FIG. 2 illustrates example components of a machine learning service at which classification models and corresponding explanatory rule sets may be generated, according to at least some embodiments.

FIG. 2 illustrates example components of a machine learning service at which classification models and corresponding explanatory rule sets may be generated, according to at least some embodiments. System 200 includes various components of a scalable machine learning service, including an explanation query handler 281 which may generate and provide easy-to-understand explanations 295 for classifier predictions, e.g., using rule-mining algorithms from algorithm libraries 263. The classifiers themselves may be trained using the machine learning service's server pools 285 and algorithm libraries 263. The machine learning service may be implemented at a provider network in some embodiments as mentioned earlier, and the resources used for the machine learning service may be distributed among a number of different data centers. In at least some embodiments as mentioned above, a client may select a classification methodology and train a model, and then provide the training data and corresponding model predictions to be mined for explanatory rules—that is, the machine learning service may not necessarily be responsible for the classification algorithm implementation.

In the depicted embodiment, input data for various types of analysis may be obtained from input data sources 230. Some of the data sources may comprise previously-collected or batched data records, while others may comprise ongoing or streaming data records. In addition to the explanation query handler 281, the machine learning service (MLS) may comprise a request handler 280, a knowledge base 222, and an artifacts repository 220 in the depicted embodiment. The knowledge base 222 may represent a growing collection of entries representing insights gained during earlier instances of the use of classifiers and explainers for a variety of data sets, and may be used to guide some of the decisions made by the explanation query handler 281, such as the selection of rule mining and/or classification algorithms. In some cases, a number of parameter values may have to be selected for a given rule mining algorithm, such as the number of decision tree nodes to be generated, the maximum number of attributes to be permitted in a rule, and so on. The artifacts repository 220 may be used to store interim and/or final results of classifiers and explainers, values of the parameters selected, and so on.

A set of one or more programmatic interfaces 261 may be implemented at the machine learning service for interactions with clients 264 in the depicted embodiment. The interfaces may include, for example, one or more web-based consoles or web pages, application programming interfaces (APIs), command-line tools, graphical user interfaces (GUIs) or the like. Using interfaces 261, clients 264 may, for example, submit a request to train a classification model using records from an input data source 230, or a request to explain a prediction of a classification model. The data source 230 may be identified, for example, by providing access information such as a network address, a database address, and/or a storage device address. In some implementations an SQL-based programmatic interface may be included in programmatic interfaces 261, enabling clients to submit explanation requests using familiar and easy-to-use interfaces.

In various embodiments, the raw data records of a data source may be pre-processed (e.g., at input record handlers 260 and/or at feature processors 262) at various stages of the classifier generation and explainer generation procedures—e.g., before the classification algorithm is applied, or after the classifier is created but before the rule mining phase for the explainer is begun. Such pre-processing may include binarization of categorical attributes, binning of numeric attributes, and the like. Other types of pre-processing may also be implemented in various embodiments, such as cleansing data by removing incomplete or corrupt data records, normalizing attribute values, and so on.

In their programmatic interactions with the MLS via interfaces 261, clients 264 may indicate a number of preferences or requirements which may be taken into account when training classifiers and/or explaining classifier predictions in various embodiments. For example, clients may indicate a classification algorithm, a rule mining algorithm, sizes of training sets and/or test sets, relative weights that are to be assigned to various attributes with respect to classification, and so on. Some clients 264 may simply indicate a source of the observation records and leave the modeling and explanation-related decisions to the MLS; other clients, who are more conversant with the statistics involved or who are experts in the subject matter or domain for which the stream records are collected, may provide more detailed guidance or preferences with regard to the classification or explanation stages.

The administrative or control plane portion of the MLS may include a request handler 280, which accepts client requests 211 and takes different actions depending on the nature of the analysis requested. Some requests (such as requests for explanations of a classifier prediction) may be handled in real time or in near-real time, while other requests (such as requests to train a classifier using a large data set) may be handled in the form of longer-lasting batch jobs. For batch-mode operations, the request handler may insert corresponding job objects into batch job queue 242, as indicated by arrow 212. In general, the control plane of the MLS may comprise a plurality of components (including the request handler, the explanation query handler, workload distribution strategy selectors, one or more job schedulers, metrics collectors, and modules that act as interfaces with other services) which may also be referred to collectively as the MLS manager. The data plane of the MLS may include, for example, at least a subset of the servers of pool(s) 285, storage devices that are used to store input data, intermediate results or final results (some of which may be part of the MLS artifact repository), and the network pathways used for transferring client input data and results.

A given batch job object may indicate one or more operations that are to be performed as a result of the invocation of a programmatic interface 261, and the scheduling of a given job may in some cases depend upon the successful completion of at least a subset of the operations of an earlier-generated job. For example, one job may be created to train a classifier, while a subsequent job may be created to generate a rule set for explaining the classifier's predictions. In at least some implementations, job queue 242 may be managed as a first-in-first-out (FIFO) queue, with the further constraint that the dependency requirements of a given job must have been met (e.g., that the classifier training has completed before the explanatory rules are mined) in order for that job to be removed from the queue. In some embodiments, jobs created on behalf of several different clients may be placed in a single queue, while in other embodiments multiple queues may be maintained (e.g., one queue in each data center of the provider network being used, or one queue per MLS customer). Asynchronously with respect to the submission of the requests 211, the next job whose dependency requirements have been met may be removed from job queue 242 in the depicted embodiment, as indicated by arrow 213, and a processing plan comprising a workload distribution strategy may be identified for it. The workload distribution strategy layer 275, which may also be a component of the MLS control plane as mentioned earlier, may determine the manner in which the lower level operations of the job are to be distributed among one or more compute servers (e.g., servers selected from pool 285), and/or the manner in which the data analyzed or manipulated for the job is to be distributed among one or more storage devices or servers. As indicated by arrow 235, the workload distribution strategy layer 275 may also be utilized by explanation query handler 281 in some embodiments, e.g., to help identify the number or set of servers to be used for rule mining. After the processing plan has been generated and the appropriate set of resources to be utilized for the batch job or the real-time analysis has been identified, operations may be scheduled on the identified resources. Results of some batch jobs or real-time analyses may be stored as MLS artifacts within repository 220 in some embodiments, as indicated by arrow 247.

In the embodiment shown in FIG. 2, clients 264 may be able to view at least a subset of the artifacts stored in repository 220, e.g., by issuing read requests 218. Explanations 295 produced in response to client queries may be made available from the query handler 281 via interfaces 261 in some embodiments. Entries may be added to the knowledge base based on input received from clients in the depicted embodiment, and knowledge base entries may also be viewed by the clients in at least some embodiments, as indicate by arrow 217. In some embodiments, a relatively straightforward language for feature processing specification may be supported, allowing MLS clients to create "recipes" indicating various feature processing steps that they wish to have applied on data sets. Such recipes may be specified in text format, and then compiled into executable formats that can be re-used with different data sets on different resource sets as needed, e.g., at feature processors 262. Algorithm libraries 263 may include a wide variety of machine learning, statistics and data analysis algorithms, such as various types of regression and classification algorithms, rule mining algorithms, and the like. In at least one embodiment, the MLS may be designed to be extensible—e.g., clients may provide or register their own modules (which may be defined as user-defined functions) for input record handling, feature processing, or for implementing additional machine learning algorithms than are supported natively by the MLS.

In at least some embodiments, the training of a classifier and/or the generation of explanatory rules for a classifier's predictions may be performed in parallel, e.g., using multiple servers of server pools 285. The number of servers to be employed and/or the particular group of servers to be used for a given classification and explanation problem may be selected based on various factors by the MLS control plane, such as the particular classification algorithm or rule mining algorithm being used, the size of the training data, the number or fraction of free servers available in the pool, and so on.

Feature Transformation Examples

Figure 3:
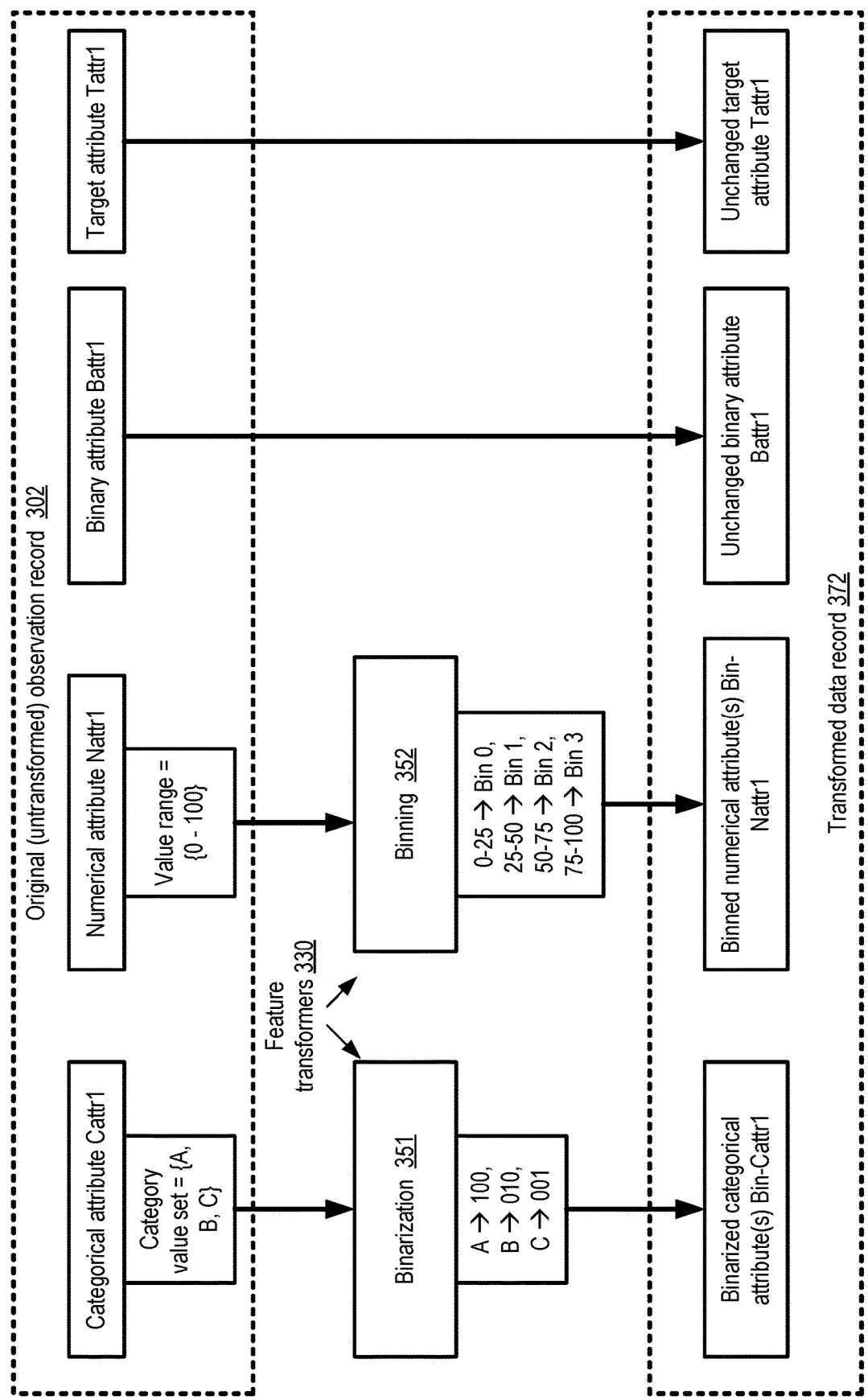
FIG. 3 illustrates examples of transformations which may be applied to raw input data prior to generating explanatory rules for the predictions made by a classifier trained using that input data, according to at least some embodiments.

FIG. 3 illustrates examples of transformations which may be applied to raw input data prior to generating explanatory rules for the predictions made by a classifier trained using that input data, according to at least some embodiments. In the depicted scenario, an observation record 302 of a data set comprises three input attributes and a target or output attribute Tattr1 whose value is to be predicted by a classifier. Among the three input attributes, categorical attribute Cattr1 may take any of the three category value set members A, B or C as its value, while numerical attribute Nattr1 can take any numerical value in the value range 0 to 100. Binary input attribute Battr1 can take on values 0 or 1. Tattr1 may take on any of several class values.

Before rule mining is begun with respect to the predictions made for Tattr1 by the classifier selected for the data set to which observation records 302 belong, the categorical and/or numeric attribute values of the training data set may be transformed. Two example feature transformers 330 are shown: one which performs binarization 351 on the categorical variable Cattr1, and another which performs binning 352 on the numeric attribute Nattr1. In binarization, a set of binary values comprising N members, where N is the cardinality of the category value set of Cattr1, is generated for each observation record, and a value of 0 or 1 is assigned to the binary values depending on which one of the values is taken by Cattr1 in that observation record. Since Cattr1 can take on three values (A, B or C), a binary value set of size three is used in the depicted example. The first binary digit is set to 1 if the record's Cattr1 value is A, with other two binary digits being set to zero. Similarly, if the Cattr1 value is B, the second binary digit is set to 1, and the first and third are set to zero. Thus, A is mapped to the binary digit sequence 100, B to 010, and C to 001 in the depicted example. For categorical attributes such as Cattr1, it may typically be the case that assigning an order to the different values in the raw input is not possible, as there may not be a comparison operator which can be used to decide whether a given category value is greater or smaller than another.

With respect to numeric attributes such as Nattr1, for which relative ordering of values is possible, a binning transformation (which preserves some ordering information, although at a coarser granularity than the raw data values) may be used. In the depicted example scenario, in which Nattr1 can take on values in the range 0 to 100, four bins or buckets are created. Values less than 25 are assigned to bin 0 (e.g., mapped to the transformed value 0), values in the range 25-50 are assigned to bin 1, values in the range 50-75 are assigned to bin 2, and the remaining values greater than 75 are assigned to bin 3. Although the bin ranges or widths are equal in the depicted example, in general not all the bins need to have the same range or width. The values of the binary attribute Battr1 and the target attribute Tattr1 may be left unchanged in the transformed data record 372 in the depicted embodiment. Transformations of the kinds shown in FIG. 3 may be helpful for rule miners in various embodiments, as it may be easier to generate predicate-based rules in terms of small attribute value ranges (e.g., zeroes or ones for categorical attributes, and bin identifiers for numeric attributes). Other types of transformations may be used in various embodiments to help simplify the task of rule mining; the example transformations shown in FIG. 3 are not intended to limit the kinds of transformation functions which may be used.

Trivial Data Set Example

FIG. 4 illustrates a simple example of the generation of explanatory rules for a classifier's predictions, according to at least some embodiments. In the depicted embodiment, the classification problem to be solved is to predict the favorite sport of an individual, for example from a small set of sports such as the set comprising soccer, baseball, cricket and tennis. Each observation record (such as Rec0, Rec1, Rec2, or Rec3) of training data set 401 comprises values for three input variables 405 in addition to the target or class variable 407 labeled "favorite sport": the country in which the corresponding individual resides, the year of birth of the individual, and an annual income of the individual. A very small number of observation records is shown in FIG. 4 to keep the example simple and to avoid clutter; in practice, a training data set may comprise far more records (e.g., millions of records may be used in some cases).

A classifier may be trained using the observation records of training set 401, and may produce a predicted favorite sport for each training set record. Any desired classification algorithm may be selected in various embodiments; for the purposes of illustrating the techniques for explaining classifier predictions at a high level, the specific classification algorithm used does not matter. The predictions made for Rec0-Rec3 by the trained classifier are shown in table 411. The predictions are correct with respect to Rec0, Rec1 and Rec2, but the prediction for Rec3 (for which the classifier predicts soccer as the favorite sport, whereas the observation record indicated that tennis was the actual favorite sport) happens to be incorrect.

A transformed version of the training data combined with the predictions made for the respective records forms the input 241 provided to a selected rule mining algorithm in the depicted embodiment. In the transformed data, the values of the country attribute have been mapped to a sequence of binary values of length three (assuming that the only country values in the training data are US, UK and Japan). If the country is USA, the binary values are set to 1-0-0; if the country is UK, the values are set to 0-1-0 and if the country is Japan, the values are set to 0-0-1. The income has been mapped to four bins labeled 0 (for incomes less than $75000), 1 (for incomes between $75000 and $90000), 2 (for incomes between $90000 and $100000) and 3 (for incomes greater than $100000) respectively.

Two examples 425 of the kinds of easy-to-understand rules or assertions which may be generated from the input 241 by a selected rule miner are shown. Each rule indicates predicates for one or more of the input attributes, and an implication corresponding to those predicates. The first explanatory rule R0 has two attribute predicates: if the country is UK and the income is greater than 90000, this implies that the classifier will predict that the favorite sport of the individual is cricket. The second rule R1 also has two attribute predicates: if the country is USA and the year of birth is earlier than 1980, this implies that the classifier will predict that the favorite sport of the individual is baseball. By providing such rules to explain the predictions of the classifier, the explainer may be able to summarize the work done by the classifier in a manner that is satisfactory to the clients (even if the actual logic used by the classifier to arrive at its predictions differs from the attribute predicate based logic indicated in the rule).

Rule Ranking Criteria

As mentioned earlier, in at least some embodiments the rules obtained by the selected rule mining algorithm may be ranked relative to one another. FIG. 5 illustrates examples of criteria which may be used to evaluate or rank rules, according to at least some embodiments. Table 521 contains the information (shown in an untransformed version to simplify the discussion) regarding ten data records Rec0-Rec9 which may be available as input for rule mining. Each record contains values for three input variables—a country of residence, a year or birth and an annual income—as well as the favorite sport predicted by a classifier. The ten records may be part of a test data set in some embodiments—that is, these observation records may not have been used for training the classifier. In other embodiments, at least some records of the training set may be used to rank the rules.

Using the contents of table 521, a selected rule mining algorithm has obtained a rule set 525 comprising three rules R0, R1 and R2. Each rule indicates some set of predicates on the input attributes, and an implication about what the classifier would predict regarding the favorite sport if the attribute predicate conditions are met by a given observation record. Two example criteria for ranking the rules are shown: support or coverage (indicative of the fraction of the input data which meets the attribute predicate conditions of the different rules) and confidence or accuracy (indicative of the correctness of the implication).

In the case of rule R0, a data record fulfills the predicate condition if the country is UK. Since eight of the ten records (all except Rec3 and Rec5) shown have UK as the country value, the support metric value for R0 is 80%. Among those eight records with UK as the country, soccer is predicted as the favorite sport for five records (all except Rec1, Rec7 and Rec9), so the confidence metric for the rule R0 (which includes the implication that soccer is the favorite sport of all individuals living in the UK) is calculated as 5/8 or 62.5%.

Similarly, with respect to rule R1, four out of the ten records Rec0-Rec9 meet the predicate conditions (that the country be UK and the year of birth be earlier than 1985), so the support metric is computed as 4/10 or 40%. Among the four records which satisfy the predicates of rule R1, three match the implication of rule R1, so the confidence is set to 3/4 or 75%. Similarly, a support metric value of 3/10 or 30% is calculated for rule R2, and a confidence level of 100% is computed for R2. The support and confidence levels may be combined to derive an overall ranking metric for the rules in some embodiments—e.g., a formula in which the support level is simply added to the confidence level to obtain the overall ranking metric, or in which a weighted sum of the two metrics is used as the overall ranking metric, may be used in different embodiments. Metrics other than support and/or confidence may be used in at least some embodiments. For example, in some embodiments and depending on the type of classification being performed, metrics such as precision, recall or accuracy may be used.

Classifiers with Internal Representations of Input Data

Figure 6:
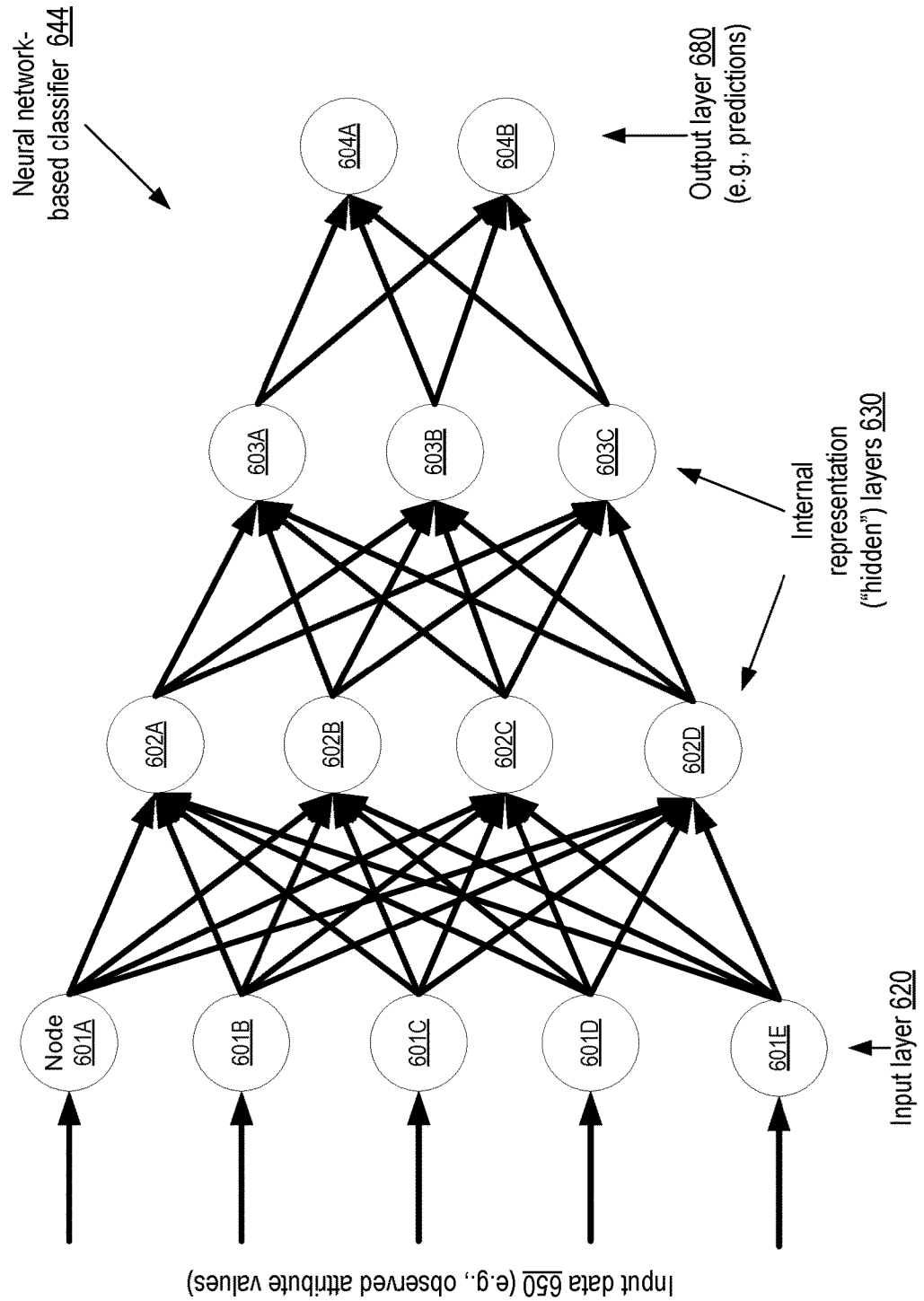
FIG. 6 illustrates an example of a neural network-based classifier, according to at least some embodiments.

Some classification algorithms may be layered, in that they may involve the generation of internal intermediary representations of various properties of the input data, with the classification decisions being made at least partly on the basis of the internal representations rather than on the basis of the input data alone. Neural network based classifiers form one example of such algorithms. FIG. 6 illustrates an example of a neural network-based classifier, according to at least some embodiments. Neural network models in general may include several interconnected layers of nodes (roughly modeled on the connections between brain cells or neurons in the central nervous systems of various biological species). In classifier 644, nodes 601 (e.g., 601A-601F) form an input layer, nodes 604 (e.g., 604A and 604B) form the output layer, and nodes 602 (602A-602D) and 603 (603A-603C) for internal representation layers or hidden layers. Input data regarding the attribute values of the training data records may be provided to the input layer nodes, and the predictions regarding the target class may be made at the output layer.

Each node may transmit weighted information based on the inputs it receives to some set of nodes at the next layer. The weights may be adjusted over time as additional information becomes available, and an activation function may be applied to the inputs at a given node to convert the weighted inputs to the outputs. Each internal or hidden node may represent or summarize some combination of properties of one or more input layer nodes.

Mathematically, each node of a neural network may represent a respective function, with the output layer producing the results of the composition of the functions at the input and internal layers. The internal representation layers may thus play a significant role in the predictions made at the output layer of neural network classifiers. As such, it may be useful in various embodiments to mine for explanatory rules formulated in terms of the internal representations (e.g., in addition to, or instead of rules formulated in terms of the input data). The internal representations may be considered examples of model features or model attributes, in contrast to the input data features or attributes which form part of the observation records themselves. Sophisticated neural network models (e.g., the so-called "deep neural networks") may comprise many more internal representation layers than shown in FIG. 6, with many more nodes at leach layer. Similar internal representations or structures may also be generated in other classification algorithms which do not necessary employ neural networks.

Figure 7:
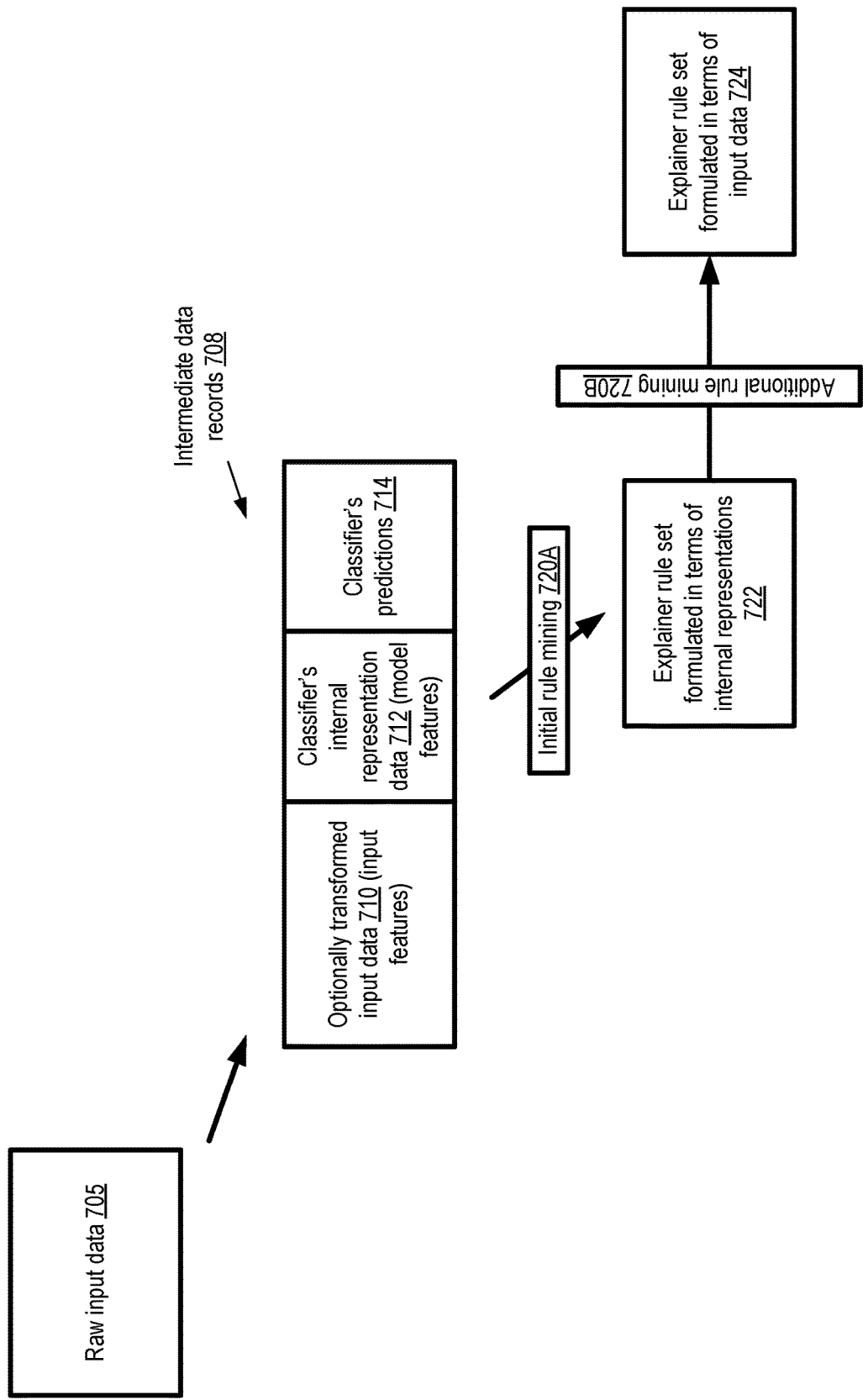
FIG. 7 illustrates an example scenario in which internal representation information generated by a classifier may be used to express explanatory rules for the classifier, according to at least some embodiments.

FIG. 7 illustrates an example scenario in which internal representation information generated by a classifier may be used to express explanatory rules for the classifier, according to at least some embodiments. In the depicted embodiment, a classifier which generates internal representations of the raw input data 705 during training is used. The intermediate data records 708 used as input for rule mining may include three subcomponents: optionally-transformed input data 710 (which may be referred to as input data features), some set of internal representations 712 (which may be referred to as model features), and the predictions 714 made by the classifier for each input data record. In at least some embodiments, at least a subset of the input attribute values may not be transformed before inclusion in the intermediate data records.

In an initial stage 720A of a potentially iterative or hierarchical rule-mining technique, an explainer with a rule set 722 formulated in terms of predicates on the properties of the internal representations may be generated. In some cases, the initial rule set may include predicates on the raw input data as well as predicates on the internal representations; that is, the initial rule set may not be restricted to predicates on the properties of the internal representations alone. The initial set of rules may be ranked relative to one another, e.g., using similar types of metrics to those discussed earlier. In response to client requests for explanations, the first-level explainer may provide explanatory rules which indicate relationships between predicates on properties of the internal representations and the classifier's predictions. In the case of neural network classifiers, for example, the predicates of the first-level explanatory rules may be expressed in terms of the weights assigned to connections to or from one or more hidden-layer nodes, the number of input links leading into a given hidden-layer node, the number of output links emanating from a given hidden-layer node, etc.

In some cases, clients may wish to obtain explanations in terms of input data attributes alone. Such clients may submit additional queries, requesting further elaboration of the rules. A second stage of rule-mining 720B may be performed in response to such requests, in which the relationships between input attribute values and the intermediate representations may be identified. A second rule set 724, expressed entirely in terms of input attribute predicates, may be produced, and explanations from this second rule set may be provided to the clients which request elaboration of the first rule set's rules. It is noted that depending, for example, on the number of layers of internal representations, multiple stages of hierarchical rule mining may be performed in some embodiments, and multiple rule sets corresponding to the different layers of internal representations may be generated. In some embodiments, the machine learning system or service responsible for providing explanations for classifier predictions may be configured to only provide explanations in terms of input attribute predicates—that is, while rule mining with respect to internal representations may be performed, the results of such internal-representation-oriented rule mining may not necessarily be provided to clients. In at least one embodiment, clients may be able to indicate preferences regarding the types of explanations they wish to obtain—e.g., some clients may indicate, as a query parameter, that the explanations are to be expressed in terms of input variables alone.

Responses to Explanation Queries

Figure 8:
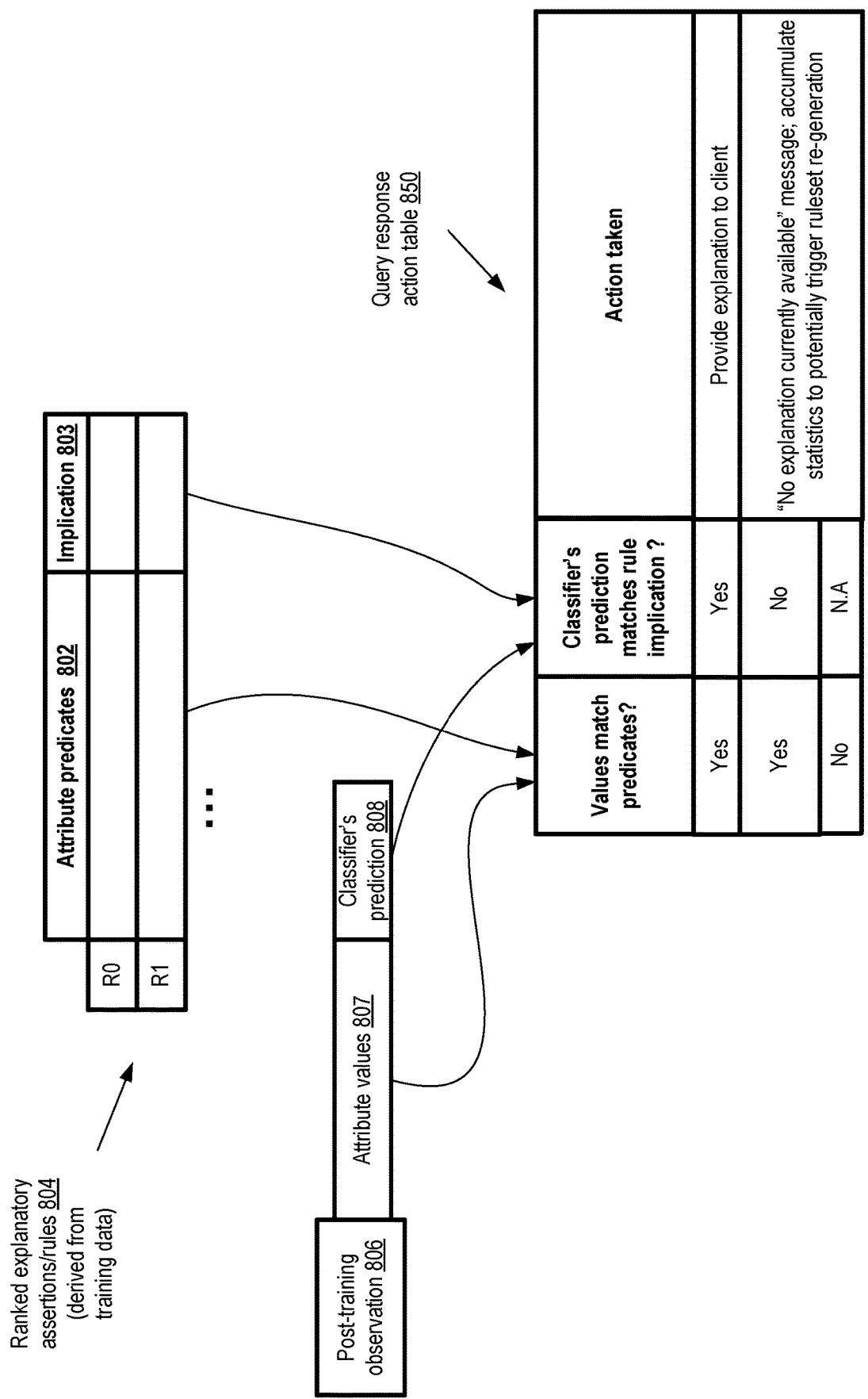
FIG. 8 illustrates examples of actions which may be taken in response to a query for an explanation of a classifier's prediction, according to at least some embodiments.

FIG. 8 illustrates examples of actions which may be taken in response to a query for an explanation of a classifier's prediction, according to at least some embodiments. A ranked set of rules 804 (e.g., R0, R1, ... ) has been generated using a training data set in the depicted embodiment. Each rule indicates some set of attribute predicates 802 and corresponding implications 803 regarding the classifier's predictions. After the classifier training is complete, a new observation record is received and a prediction 808 is provided for it. This post-training observation record 806 has a set of attribute values 807.

In response to a client query to explain prediction 808 for the post-training observation record 806, the explainer may examine the rule set 804, e.g., in order of decreasing rank, to determine whether any of the rules in its rule set is applicable or not. The operations to determine whether a given rule is applicable to a given query regarding a prediction may be referred to as matching operations herein. Three possibilities may exist with respect to identifying applicable rules, as shown in action table 850. If the attribute values 807 match (or overlap) with the attribute predicates 802 of at least one rule, and the prediction 808 matches the implication in that rule, such a rule may be provided to the client as an explanation for the prediction. If several rules are found, one may be selected based on its rank and/or on its generality or ease of understandability. It is noted that to identify an applicable explanatory rule in the matching operations, an exact match may not be required—for example, a rule may be expressed using a range predicate on an attribute, and the rule may be considered applicable as long as the attribute's value falls within the range, and as long as the prediction made by the classifier is the same as the prediction indicated in the rule's implication component.

If the values of the attributes in the post-training observation record are compatible with the predicates indicated in at least one rule, but none of the matching rules contain an implication which matches the classifier's actual prediction, in at least some embodiments a message indicating that no explanation was available may be provided to the client. Metrics regarding the number or fraction of queries for which no explanatory rule was found may be updated, and used to trigger additional rule mining (e.g., with at least some observations for which no explanations were found being included in the input used for the additional rule mining). Similarly, if the attributes values 807 of the post-training observation record do not match any of the predicates for which rules have been generated, this may also result in a "no explanation is currently available" message and the updating of metrics or statistics regarding the effectiveness of the explainer.

Methods of Generating Explainers for Complex Classifiers

Figure 9:
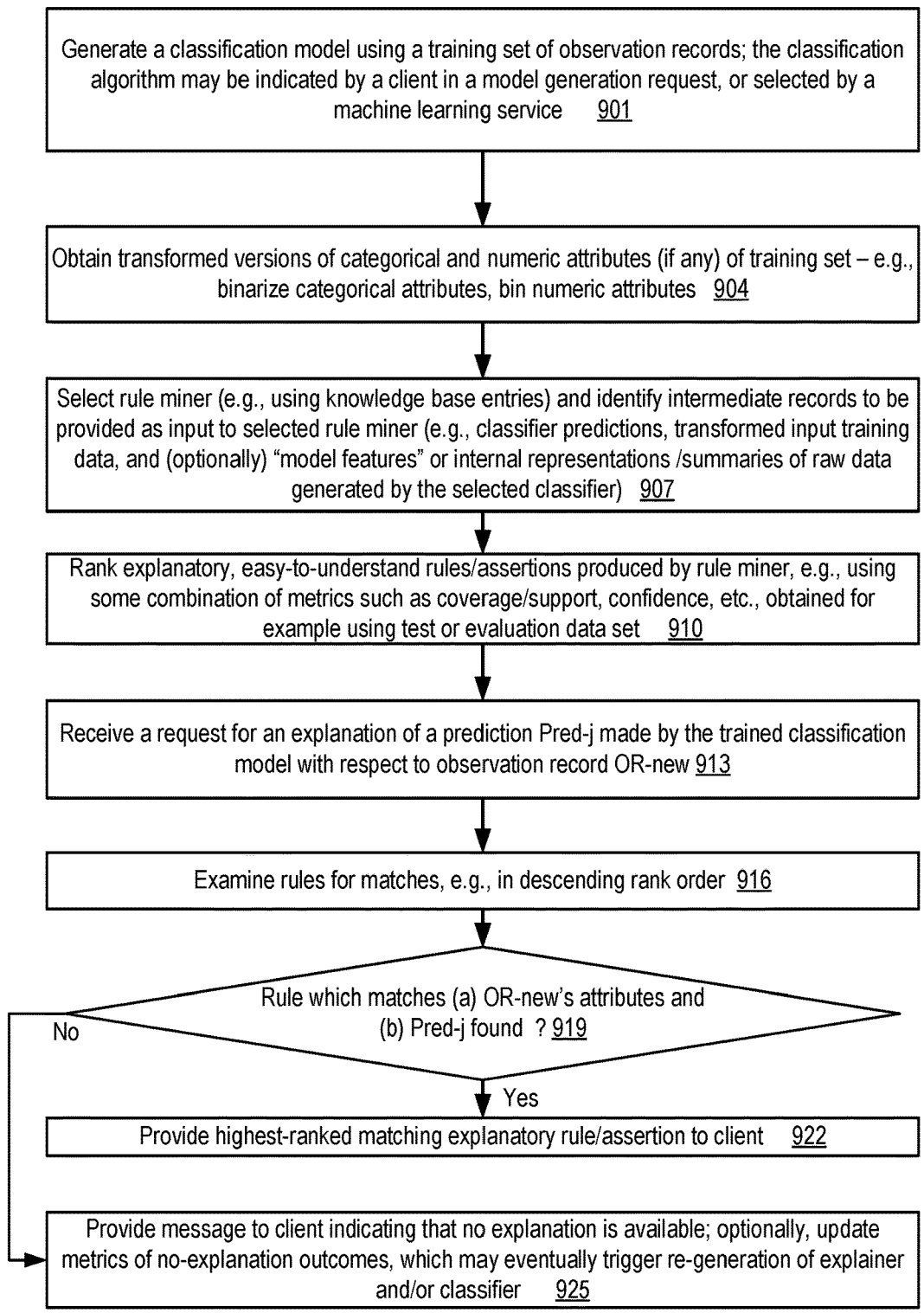
FIG. 9 illustrates aspects of operations that may be performed to generate easy-to-understand explanations for complex classifiers, according to at least some embodiments.

FIG. 9 illustrates aspects of operations that may be performed to generate easy-to-understand explanations for complex classifiers, according to at least some embodiments. As shown in element 901, a classification model may be generated or trained using a training set of observation records. The particular classification algorithm used for the model may be indicated in a client request for the model, or may be selected by a component of a machine learning service (e.g., based on contents of a knowledge base of the service). In various embodiments the classification algorithm may be chosen based on expected accuracy rather than on how easy it is for non-experts to understand the internal working of the algorithm. Transformed versions of some or all of the attribute values of the training data set may be obtained in the depicted embodiment—e.g., by binning numeric attributes and/or using the binarization technique discussed above for categorical attributes (element 904). The transformations or feature processing functions may be applied to the raw input data to make it more suitable for rule mining in some embodiments. It is noted that such transformations may not be required for all rule mining techniques—that is, the transformed versions of the raw input may not be required in some embodiments.

A rule mining algorithm may be selected for generating the explanatory rules (element 907), and the input data for the rule miner may be prepared. The rule miner input may be referred to as an intermediate data set. The records of the intermediate data set may include the transformed versions of the training set attribute values and the predictions regarding the classes to which the corresponding (untransformed) versions of the training data records were assigned by the classifier in some embodiments. Depending on the nature of the classification algorithm, it may be the case that one or more layers of internal representations summarizing various properties of the input data according to the logic of the algorithm may have been prepared during training (such as hidden layer nodes in the case of neural network based algorithms, for example). In some embodiments, these internal representations, which may also be referred to as model features (as distinguished from the features of the input data itself) may be included in the intermediate data set which is used as input by the rule miner.

A set of explanatory rules or assertions may be generated by the selected rule miner from the intermediate data set. The rules may be expressed in an easy-to-understand format in which the conditions for a given rule are formulated in terms of predicates on attribute ranges or values, and the implication part of the given rule indicates the class or output variable value produced by the classifier for an observation record whose attributes match or satisfy the predicates. The rules may be ranked relative to one another (element 910) based on some combination of factors such as coverage or support levels (e.g., indicative of the fraction of records of a test data set or evaluation data set which satisfy the rule predicates), confidence or accuracy (e.g., indicative of the fraction of records whose actual predictions match the implication portion of the rules). In some implementations, at least a preliminary level of ranking may be performed using the training data itself.

The trained classifier may generate predictions (such as a particular prediction referred to as "Pred-j" in FIG. 9) for numerous observation records which were not used for training or testing the classifier (including an observation record referred to as "OR-new" in FIG. 9 in the case of Pred-j). A request to provide an explanation for Pred-j may be received (element 913), e.g., at an explainer which has access to the ranked rules. The explainer may examine the rules for matches with respect to OR-new and Pred-j, e.g., in descending rank order or using indexes set up on the rule set (element 916). In at least some embodiments, the rule set may be stored or cached in main memory at one or more computing devices to make the matching operations more efficient. If one or more rules which match OR-new's attribute values and also correctly indicate that the classifier would have predicted Pred-j are found (element 919), one of the found rules (e.g., the one with the highest rank) may be provided as the explanation for the prediction of Pred-j (element 922). It is noted that in some embodiments, the rule provided to the explanation requester may be selected based at least partly on other factors than the rule's rank alone—e.g., the generality of the predicate may be used as a selection factor, or the number of attributes indicated in the predicate may be used as a selection factor.

If no matching rules are found (as also detected in operations corresponding to element 919), a message indicating that an explanation is currently unavailable may be provided in response to the request regarding Pred-j (element 925). In at least some embodiments, metrics regarding the kind of responses (e.g., a satisfactory explanation versus a "no explanation is available" message) provided to explanation requests may be updated. If the metrics regarding unsatisfactory responses reach a threshold, in such embodiments this may trigger the re-generation of additional rules (e.g., using a larger input set for the rule miner, including at least some observations for which no explanations were available) and/or re-training of the classifier.

It is noted that in various embodiments, some of the operations shown in FIG. 9 may be implemented in a different order than that shown in the figure, or may be performed in parallel rather than sequentially. Additionally, some of the operations shown in FIG. 9 may not be required in one or more implementations.

Use Cases

The techniques described above, of providing explanations (formulated in terms easy for non-experts to understand) for the results produced by complicated classification models such as neural network-based classifiers may be useful in a variety of environments. As machine learning techniques are employed at increasing numbers of organizations with more deployable computing capacity, e.g., using cloud-based machine learning services, the results produced by sophisticated algorithms may generally become more accurate. However, for many applications such as loan-granting, blocking users from online marketplaces or web-sites, and the like, simply relying on the decisions made by algorithms may be unsatisfactory unless an accompanying rationale is provided when a decision is disputed or unclear. The approach of splitting the classification process from the explanation process may allow machine learning services to achieve the best of both worlds—that is, the most technically advanced classification techniques may be selected, resulting in the highest quality predictions, while at the same time relatively straightforward-seeming explanatory rules may be provided in response to requests to justify the predictions.

Illustrative Computer System

Figure 10:
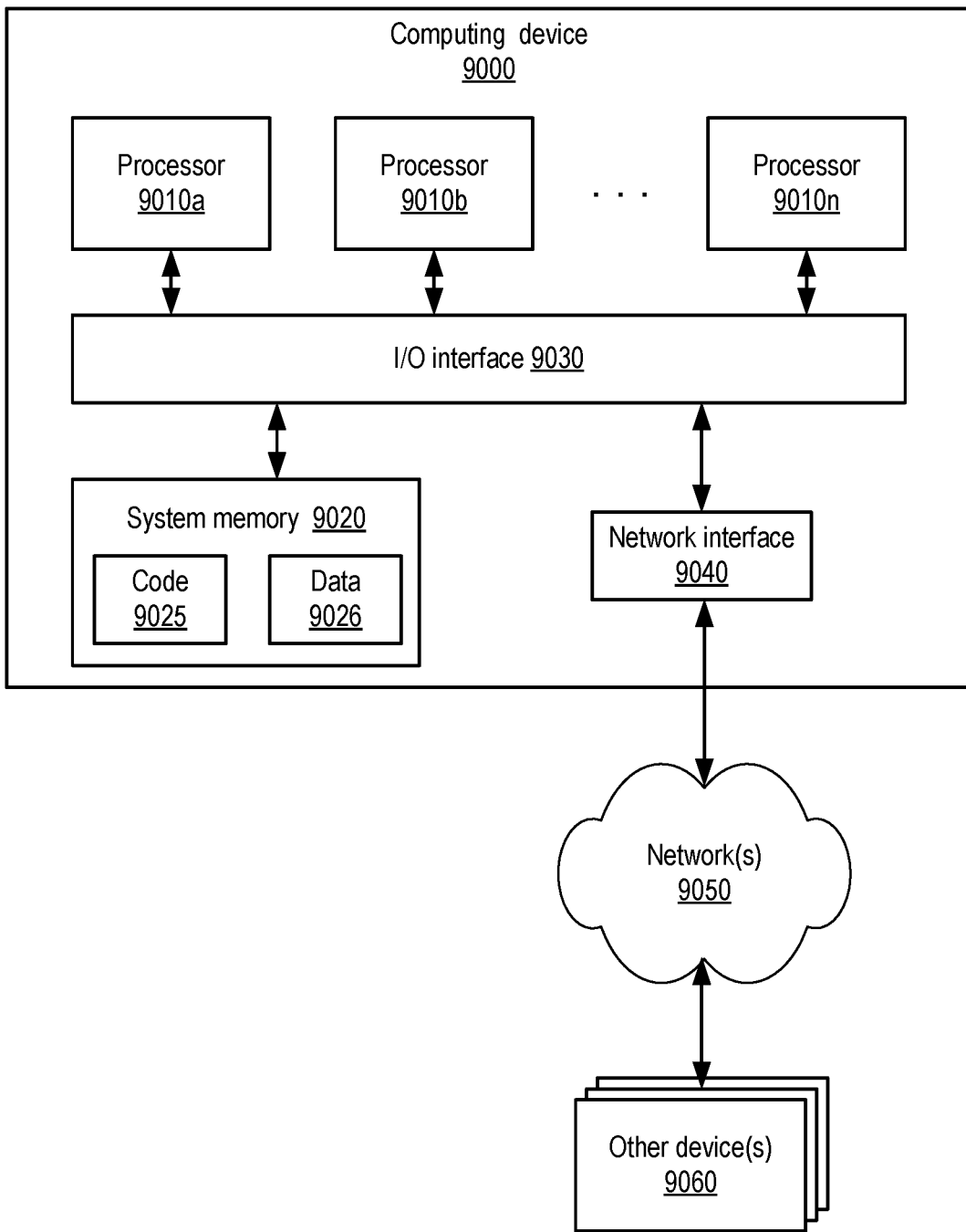
FIG. 10 is a block diagram illustrating an example computing device that may be used in at least some embodiments.

In at least some embodiments, a server that implements one or more of the techniques described above for explain classification predictions (including for example explanation query handlers, execution platforms and other components of a machine learning service, standalone classifiers or explainers, and the like) may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of a machine learning service implemented at a provider network;
wherein the one or more computing devices are configured to:
receive a first request, via a programmatic interface from a client, to generate a classification model with respect to an input data set comprising a plurality of observation records, wherein individual ones of the observation records comprise respective values of (a) a plurality of input variables and (b) an output variable;
train, using a selected classification algorithm, the classification model based at least in part on an analysis of a training set of observation records of the input data set;
generate, corresponding to at least a subset of observation records of the training set, a transformed data set comprising a plurality of intermediate data records, wherein a particular intermediate data record of the transformed data set comprises: (a) a binarized feature derived from a corresponding non-binary attribute value of a particular observation record of the training set and (b) a prediction produced by the classification model for the output variable with respect to the particular observation record;
identify, using a selected rule mining algorithm on the transformed data set, a plurality of explanatory rules, wherein a first explanatory rule of the plurality of explanatory rules indicates an implied relationship between a prediction result of the classification model and a predicate on a particular attribute of the observation records;
rank the plurality of explanatory rules based on one or more ranking metrics; and
in response to a request for an explanation of a particular prediction produced by the classification model with respect to a second observation record, provide a representation of a particular explanatory rule, wherein the particular explanatory rule is selected from the plurality of explanatory rules based at least in part on (a) a rank of the particular explanatory rule and (b) a result of a comparison between a predicate of the particular explanatory rule and the second observation record.

2. The system as recited in claim 1, wherein the first request indicates the selected classification algorithm.

3. The system as recited in claim 1, wherein the selected classification algorithm comprises one or more of: (a) a neural network algorithm, (b) a random forest algorithm, or (c) a boosted gradient tree algorithm.

4. The system as recited in claim 1, wherein the selected rule mining algorithm comprises one or more of: (a) an Apriori algorithm, (b) an FP-Growth (Frequent Pattern-Growth) algorithm, (c) a CPAR (Classification based on Predictive Association Rules) algorithm, (d) a CN2 induction algorithm, (e) a CMAR (Classification based on Multiple Association Rules) algorithm, (f) a SLIPPER (Simple Learner with Iterative Pruning to Produce Error Reduction) algorithm, (g) a CART (Classification and Regression Tree) algorithm, (h) an ID3 (Iterative Dichotomizer 3) algorithm, (i) a C4.5 algorithm or (j) a C5.0 algorithm.

5. The system as recited in claim 1, wherein the one or more computing devices are configured to:
in response to the first request, select, based at least in part on an examination of a knowledge base entry of the machine learning service, one or more of (a) a classification algorithm or (b) a rule-mining algorithm.

6. A method, comprising:
performing, at one or more computing devices:
identifying a training set of observation records used to generate a classification model;
determining, corresponding to at least a subset of observation records of the training set, a transformed data set comprising a plurality of intermediate data records, wherein a particular intermediate data record of the transformed data set comprises: (a) a feature derived from a corresponding attribute value of a particular observation record of the training set and (b) a prediction produced by the classification model for an output variable with respect to the particular observation record;
generating, using a selected rule mining algorithm on the transformed data set, an explainer corresponding to the classification model, wherein a first explanatory rule of a plurality of explanatory rules of the explainer indicates a relationship between a prediction result of the classification model and a predicate on a particular feature corresponding to one or more observation records;
in response to a request for an explanation of a particular prediction produced by the classification model with respect to a second observation record, providing a representation of a particular explanatory rule selected from the plurality of explanatory rules based at least in part on a result of a rank of the particular explanatory rule and a match operation with respect to a predicate of the particular explanatory rule and the second observation record.

7. The method as recited in claim 6, wherein during training of the classification model, an internal representation corresponding to at least a portion of the training set is generated, wherein the particular intermediate data record comprises the internal representation.

8. The method as recited in claim 7, wherein the classification model comprises a neural network model, and wherein the internal representation comprises a particular node of a neural network.

9. The method as recited in claim 6, further comprising performing, by the one or more computing devices:
determining, corresponding to at least a subset of observation records of a second training set used to train a second classification model, a second transformed data set comprising a second plurality of intermediate data records, wherein a first intermediate data record of the second transformed data set comprises: (a) a feature derived from a corresponding attribute value of a first observation record of the second training set, (b) an internal representation, produced by the second classification model, of at least a portion of the first observation record and (c) a prediction produced by the classification model for an output variable of the first observation record;

generating, using the second transformed data set, a second explainer corresponding to the second classification model, wherein a first explanatory rule of a plurality of explanatory rules of the second explainer indicates a relationship between (a) a prediction produced by the second classification model and (b) a property of internal representations, produced by the second classification model, of respective observation records of the second training set; and in response to a request for an explanation of a particular prediction produced by the second classification model, providing a first-level explanation indicating a particular explanatory rule selected from the plurality of explanatory rules of the second explainer.

10. The method as recited in claim 9, further comprising performing, by the one or more computing devices:

in response to a request for an additional explanation, to be expressed in terms of input variables of observation records, of the particular prediction produced by the second classification model, provide an indication of at least another explanatory rule relating the property of the internal representations and a particular input variable.

11. The method as recited in claim 6, further comprising performing, by the one or more computing devices:

ranking the plurality of explanatory rules based on one or more ranking metrics; and selecting said particular explanatory rule from the plurality of explanatory rules based at least in part on a result of said ranking.

12. The method as recited in claim 11, wherein the one or more ranking metrics comprise one or more of: (a) a support metric indicative, with respect to a first explanatory rule of the plurality of explanatory rules, of a number of observation records whose attribute values match a predicate defined in the first explanatory rule, or (b) a confidence metric indicative, with respect to the first explanatory rule, of an accuracy of the first explanatory rule.

13. The method as recited in claim 6, wherein said identifying the classification model comprises receiving, from a client, an indication of the classification model, wherein the classification model implements a modeling algorithm selected by the client.

14. The method as recited in claim 6, further comprising performing, by the one or more computing devices:

receiving a second request for an explanation of another prediction produced by the classification model with respect to a third observation record;

determining that the plurality of explanatory rules does not include a particular explanatory rule which can be used to respond to the second request; and generating an indication that an explanation of the other prediction is not available.

15. The method as recited in claim 6, wherein the selected rule mining algorithm comprises one or more of: (a) an Apriori algorithm, (b) an FP-Growth (Frequent Pattern-Growth) algorithm, (c) a CPAR (Classification based on Predictive Association Rules) algorithm, (d) a CN2 induction algorithm, (e) a CMAR (Classification based on Multiple Association Rules) algorithm, (f) a SLIPPER (Simple Learner with Iterative Pruning to Produce Error Reduction) algorithm, (g) a CART (Classification and Regression Tree) algorithm, (h) an ID3 (Iterative Dichotomizer 3) algorithm (i) a C4.5 algorithm or (j) a C5.0 algorithm.

16. A non-transitory computer-accessible storage medium storing program instructions that when executed on one or more processors:

determine, corresponding to at least a subset of observation records of a training set comprising a plurality of observation records used to train a classification model, a transformed data set comprising a plurality of intermediate data records, wherein a particular intermediate data record of the transformed data set comprises one or more of: (a) a feature derived from a corresponding attribute value of a particular observation record of the training set or (b) a prediction produced by the classification model with respect to the particular observation record;

generate, using the transformed data set, an explainer corresponding to the classification model, wherein a first explanatory assertion of a plurality of explanatory assertions of the explainer indicates a relationship between a prediction result of the classification model and a property of a particular feature corresponding to one or more observation records of the training set; and in response to a request for an explanation of a particular prediction produced by the classification model with respect to a second observation record, provide the explanation of the particular prediction produced by the classification model with respect to the second observation record, wherein the explanation includes a particular explanatory assertion selected from the plurality of explanatory assertions based at least in part on a rank of the particular explanatory assertion and a result of a match operation between (a) a property of a feature indicated in the particular explanatory assertion and (b) a value of a feature associated with the second observation record.

17. The non-transitory computer-accessible storage medium as recited in claim 16, wherein the classification model comprises one or more of: (a) a neural network model, (b) a random forest model, or (c) a boosted gradient tree model.

18. The non-transitory computer-accessible storage medium as recited in claim 16, wherein the explanation of the particular prediction is provided in response to a first query from a client, wherein the instructions when executed on the one or more processors:

receive a second query from a client, requesting an explanation of a different prediction produced by the classification model;

determine that the explainer does not include an explanatory assertion corresponding to the second query;

provide an indication that an explanation of the different prediction is not available;

update a metric indicative of a number of failures to provide explanations in response to queries from clients; and in response to determining that the metric meets a threshold, initiate a generation of one or more additional explanatory assertions.

19. The non-transitory computer-accessible storage medium as recited in claim 16, wherein during training of the classification model, a model feature corresponding to at least a portion of the training set is generated, wherein the transformed data set includes an indication of the model feature.

20. The non-transitory computer-accessible storage medium as recited in claim 16, wherein the instructions when executed on the one or more processors:
  initiate a deployment of a selected number of execution platforms of a machine learning service to generate the plurality of explanatory assertions.

\* \* \* \* \*